United States Patent
Yih

[11] 3,866,313
[45] Feb. 18, 1975

[54] METHOD OF MANUFACTURING LIQUID CRYSTAL DISPLAY

[75] Inventor: James Yih, Sunnyvale, Calif.

[73] Assignee: Microma Incorporated, Cupertino, Calif.

[22] Filed: Apr. 11, 1973

[21] Appl. No.: 350,070

[52] U.S. Cl. ............ 29/592, 29/203 V, 350/160 LC
[51] Int. Cl.............................. H01j 5/02, G02f 1/28
[58] Field of Search ................ 350/160 LC; 141/31; 29/592, 203 V

[56] References Cited
UNITED STATES PATENTS

| | | | |
|---|---|---|---|
| 1,345,347 | 7/1920 | Chaney | 141/31 X |
| 3,666,881 | 5/1972 | Stein | 350/160 LC X |
| 3,675,988 | 7/1972 | Soref | 350/160 LC |
| 3,691,755 | 9/1972 | Girard | 350/160 R X |
| 3,711,713 | 1/1973 | Wysocki et al. | 350/160 LC X |
| 3,716,290 | 2/1970 | Borel et al. | 350/160 LC |
| 3,765,747 | 10/1973 | Pankratz et al. | 350/160 |

*Primary Examiner*—Ronald L. Wibert
*Assistant Examiner*—Paul K. Godwin

[57] ABSTRACT

This invention involves a process for manufacturing and energizing a liquid crystal display unit, and more particularly spacing and fastening mechanisms for the two parallel plates which carry the conductive electrodes, the manner of inducing the liquid crystal into the formed cavity, and technique for selectively displaying various desired patterns.

4 Claims, 7 Drawing Figures

METHOD OF MANUFACTURING LIQUID CRYSTAL DISPLAY

BACKGROUND OF THE INVENTION

1. Field of the Invention

This invention relates to a liquid crystal display employing a nematic liquid crystal. More specifically, it relates to the process for making the liquid crystal display devices and the mechanical construction thereof.

2. Prior Art

Most liquid crystal devices are comprised of two spaced parallel plates with liquid crystal between said plates. Electrical conductors for the application of a selected voltage are formed on the facing sides of the plates. When a selected voltage is applied to the liquid crystal via the electrical conductors, the liquid crystal changes from a first state to a second state. Typically, in the first state the liquid is in transparent state, while in the second state it forms a light scattering surface at the point of voltage application.

By placing formed electrodes in certain desired locations specific images coinciding with the formed electrode can be selectively made to appear in the liquid crystal. For example, one form of the liquid crystal display unit employs "front" and "rear" transparent plates, and is viewed from the "front" plate. The "front" and "rear" plates and "front" electrodes are transparent, while the rear electrode may be reflective or transparent. In addition, the "rear" plate may employ an additional layer or coating to achieve certain desired optical effects. When the device is used, light is directed into the "front" side of the display and the electrodes are energized. Various parts of the liquid crystal become light scattering and the effect is to view scattering portions on a mirror-like background. There are, of course, other forms of liquid crystal display which do not employ the same physical effect but which may employ the invention described herein.

The operation and construction of liquid crystal display devices, such as described above, is well known in the prior art. An example of such a prior art is the U.S. Pat. No. 3,322,485, issued on May 30, 1967 to Richard William, and assigned to Radio Corporation of America, Inc.

There have been numerous problems plaguing the manufacture of liquid crystal display devices. One such problem is the control of the parallelism of the two plates. In liquid crystal devices, the two plates must remain parallel and precisely spaced apart. The spacing of the plates is generally not over 12 microns and any substantial variance is critical. The problem in practice has been to economically, reliably and easily control this desired separation.

Another problem is that liquid crystals are very sensitive to impurities and thus must be hermatically sealed. However, in sealing the liquid crystal, contamination may result from the spacing and/or sealing substance. Finally, a severe problem in the manufacture has been the need to eliminate bubble formation in the liquid crystal. Bubble formation in the liquid crystal substance drastically degrades the display appearance. Bubble formation is caused primarily by the prior art capillary method of filling the cell with the liquid crystal. Thus, capillary and edge effects have been a major problem.

SUMMARY OF THE INVENTION

An object of this invention is to provide a simple and inexpensive means for spacing the two plates.

Another object of this invention is to provide a means for hermetically sealing the liquid crystal between the plates while avoiding all or most all contamination caused by the sealing agent.

Still another object of this invention is to provide a procedure for filling the display with liquid crystal while substantially minimizing bubble formation.

These objects solve the past problems for providing a simple, inexpensive procedure for: spacing the plates; fastening the plates together; filling the liquid crystal into the space between the plates; and for hermetically sealing the liquid crystal between the plates.

Still another problem has been to interconnect the liquid crystal display units and the integrated circuit employed therewith. This problem becomes even more acute as the number of display patterns increase and/or the size of the display unit becomes small. An object of this invention is to minimize this interconnect problem by placing the integrated circuit on one plate of the liquid crystal display unit.

DETAILED DESCRIPTION

The liquid crystal display unit is comprised of a liquid crystal substance between two coplanar plates of transparent glass, with a means of applying a voltage between the two plates at desired points. The present invention is a process for constructing a liquid crystal display unit that will: greatly reduce bubble formation at filling; degas the liquid crystal prior to filling; de-gas the inside walls of the liquid crystal cell; and avoid as much contamination as possible between the spacing epoxy cement and the liquid crystal, while assuring the desired parallel spacing.

Figure 1:
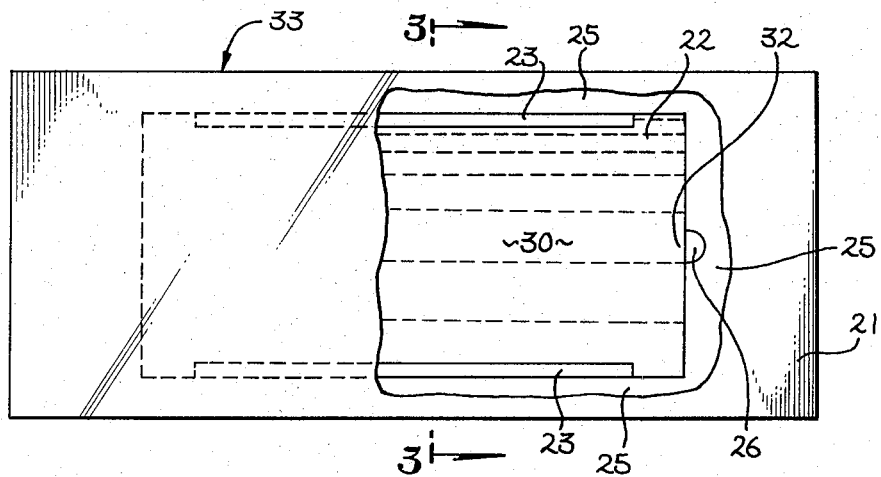
FIG. 1 is a plan view of the liquid crystal display unit.

In FIG. 1, a cross section of a liquid crystal display unit is shown. The display unit 33 has a front glass plate 22 and a back glass plate 21. The glass is the kind commonly used in the trade and must be dimenstonally stable and very flat. The back side of the back plate 21 is painted with a non-reflective black paint or coating 28. Non-reflective coating 28 substantialy reduces reflectance from the back side of plate 21 and thereby eliminates the appearance of shadows cast by reflective, conductive electrode 27. Furthermore, non-reflective coating 28 minimizes the appearance of secondary images which but for the coating would be created by light scattered from the biased portions of the nematic fluid and reflected from the back surface of plate 21. There are prior art displays which employ aluminum or other materials rather than non-reflective coating 28.

The front side of back plate 21 has a coating of conductive material 27 such as aluminum or preferably nickel or chromium covered with a layer of gold and formed into one or more electrodes and to act as reflective surface. The front plate 22 has only a transparent layer of conductive material, such as indium oxide or tin oxide, formed on its back side. The layer 29 is also formed into a desired shape which overlays a portion of electrode 27 but is transparent with respect thereto.

One of the most critical problems in producing liquid cyrstal is to space the two plates 21 and 22 parallel to each other and to retain the plates permanently in that position. There are two forms of the present invention. The first method is to employ strips of an inert stable material 23 in two parallel strips to serve as spacers. Said inert material by way of example may be the product polytetrafluoroethylene sold under the trademark Teflon. The strips 23 are placed under the longest edges of back plate 21 to act as spacers as shown in FIG. 1. Then an epoxy 25 is employed to secure and seal the front plate 22 to the back plate 21. The epoxy 25 is placed around the perimeter of the back plate 21 leaving an aperture 32 on one end. The width of aperture 32 in the present embodiment is approximately 20 percent or less of the perimeter of the back plate 21, and preferably as small as possible consistent with filling. The aperture 32 is to be used for filling of the enclosed cavity 31, a process described later. The epoxy is then cured which seals most of the perimeter of the back plate 21 to the front plate 22. Typically an epoxy sold under the trade designation may be employed. Such an epoxy requires a curing time of 30 minutes or more and when cured is inert when contracted by the liquid crystal formulation When uncured, the epoxy tend to add impurities to the liquid crystal material.

The epoxy 25 that is used must be cured. During the curing, a clamp is used to ensure the thickness of the cavity 31 will be the same as the thickness of the Teflon tape 23 or any other inert material for controlling thickness. The Teflon tape can be left in the display unit 33 since it is inert and may be made transparent. In one alternate embodiment prior to employing the epoxy 25, a minute conductive epoxy dot is placed at each corner of back plate 21 with the spacers 23 in place. The conductive epoxy dot is then cured and serves to maintain and secure the spacing of the plates during subsequent processing and serves to electrically connect the electrodes on the two plates where desired. In this embodiment the spacers 23 may remain in the display or be removed.

Figure 2:
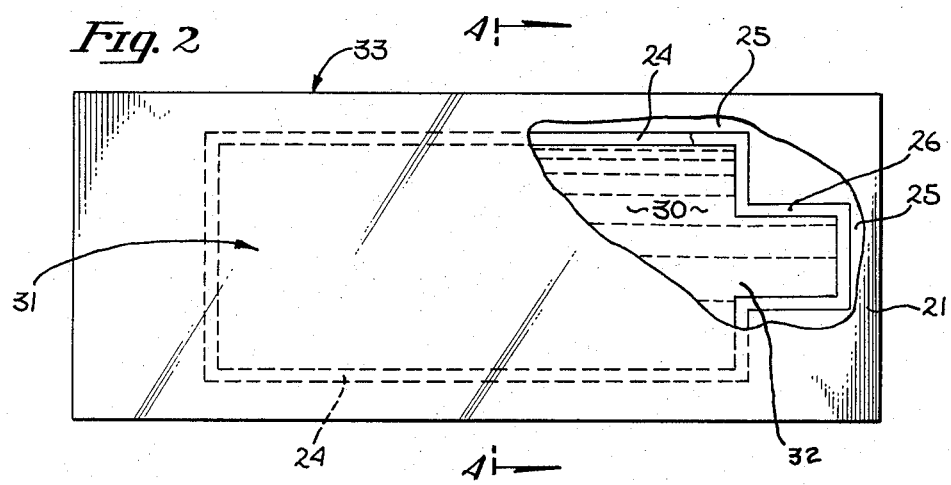
FIG. 2 is a plan view of an alternative liquid crystal display unit.
Figure 3:
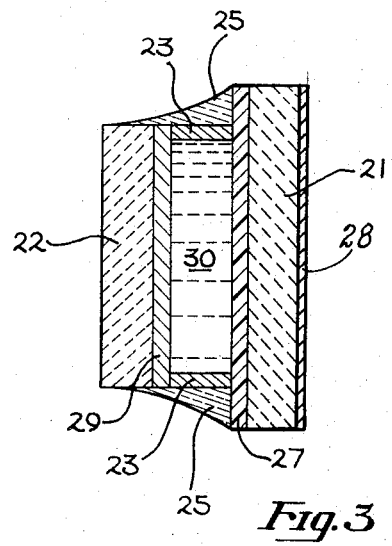
FIG. 3 is an enlarged sectional view taken along 3—3 of FIG. 1.
Figure 4:
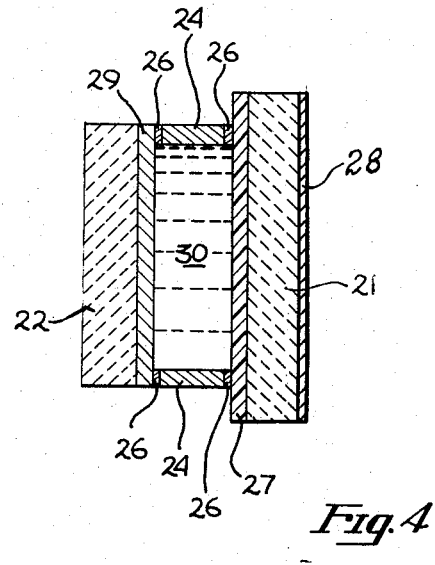
FIG. 4 is an enlarged sectional view taken along 4—4 of FIG.2.

The other alternate process is to employ an epoxy or adhesive impregnated tape 24 such as polyethylene terephthalate, the product polyethylene terephthalate sold under the trademark, Mylar, said Mylar tape coated with an epoxy 26 as the spacer. The Mylar tape would be applied around the perimeter of the back plate 21 leaving only an aperture 32 at one end, as shown in FIG. 2. This aperture will be used for filling the cavity 31 by a process described later. Then, instead of applying epoxy as in the prior method, these adhesive strips are then cured and the front plate 22 is sealed and fastened to the back plate 21.

Figure 5A:
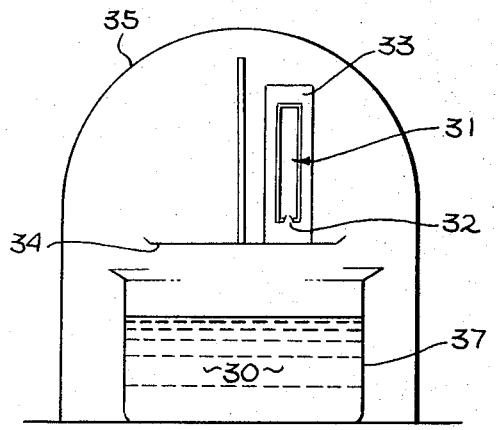
FIGS. 5a ) and 5b ) are schematic progressive illustrations of certain steps in the filling process.

The display unit 33 having a cavity 31 is now ready to be filled with liquid crystal (FIG. 5). A plurality of display units 33 are placed in a partial vacuum in a vacuum chamber 35 with the filling aperture 32 facing down. The liquid crystal 37 is placed below the display units 32 in the same vacuum chamber 35 as the empty display units 32, as shown in FIG. 5a.

A roughing pump is then used to degas the empty cavity 31 and liquid crystal 30. This pump eliminates most all of the bubbles that may form from the entrapped air in the liquid crystal and also eliminates the surface air pockets on the glass and allows better contact between the plates 21 and 22 and the liquid crystal 30.

Figure 5B:
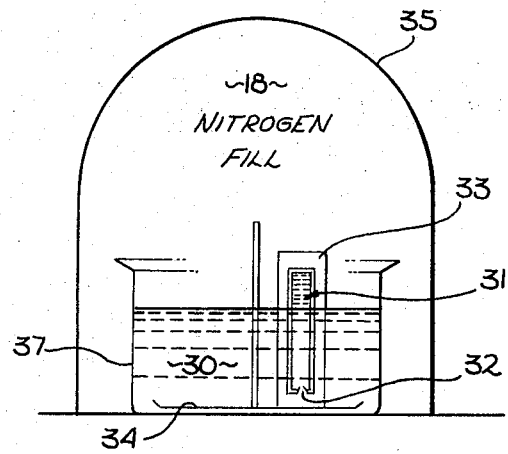

The empty display units 33 are then lowered into the liquid crystal bath with the filling aperture 32 towards the bottom of the liquid crystal container 37, as shown in FIG. 5b. The cavity 31 is then filled with liquid crystal when nitrogen 38 is back filled into vacuum chamber 35. This nitrogen back fill 38 forces the liquid crystal into the empty cavity. Due to this process of filling, the bubble formation is greatly reduced.

The filled display units 33 are then removed from the partial vacuum 35 and the filling aperture 32 is sealed. This final sealing procedure can be accomplished by two alternate methods. The first method is to simply apply the same epoxy 25 to the filling aperture 32 immediately upon removal of the display unit 33 from the partial vacuum 35. The problem with following this procedure is that contamination of the liquid crystal 30 occurs when the non-cured epoxy 25 contacts the liquid crystal 30, since the epoxy may require 30 minutes or more to cure. However, this contamination is slight because the filling aperture 32 is small.

The other and preferred method for sealing the filling aperture 32 is to use two kinds of epoxy. The first kind to apply would be a non-contaminating, epoxy 26, such as is sold under the trade designation. This non-contaminating epoxy plug 26 is applied immediately upon removal of the display unit 33 from the vacuum chamber 35. This plug 26 is only temporary and serves mainly to separate the sealing epoxy 25 from the liquid crystal 30 and to immediately seal the unit. The epoxy 25 is then applied and cured after the non-contaminating plug 26 has been cured. This process of sealing eliminates contamination of the liquid crystal 30 from the uncured epoxy 25. Note that this process for sealing can be used with any of the previously described methods requiring a five minute cure.

The advantages of using the above procedures are: (1) a reduction of bubble formation in the liquid crystal; (2) a reduction in bubble formation from the filling procedures; (3) better contact between the liquid crystal and the glass surfaces (4) minimization of contamination of the liquid crystal by the proper sealing substance; and (5) precise control of the plate spacing.

Figure 6:
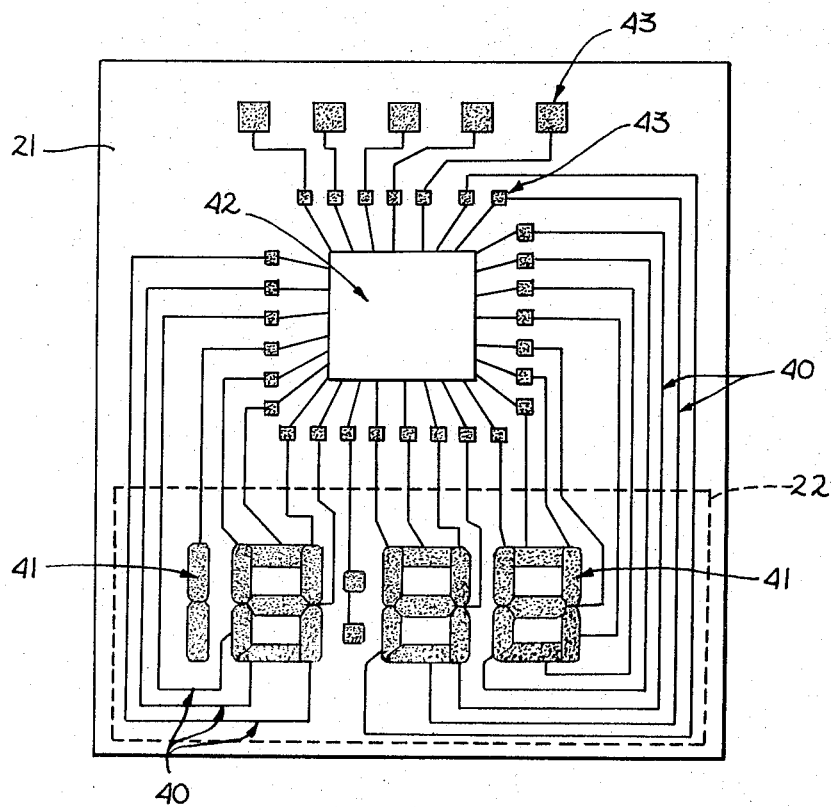
FIG. 6 is a plan view of an alternate embodiment of the liquid crystal display unit, showing the integrated circuit "driver chip."

FIG. 6, an alternate embodiment, shows the integrated circuit chip 42 and interconnected lines 40 and 41. The integrated circuit chip 42 is mounted directly onto one of the liquid crystal display unit's plates so that it is interconnected to the integrated circuit 42. The integrated circuit, in this embodiment, is attached to the rear side of the front plate by epoxy bonding or other well-known techniques, and is then connected to a pattern of conductive material, such as indium oxide 27, or any other conductive coating formed on the glass. Using this type of packaging approach, a number of many costly steps can be eliminated, and a method for making very small display units with a large number of display patterns is provided.

Thus, there has been described a simple, inexpensive method for manufacturing a liquid crystal display unit, which, if desired may be manufactured in a small package and have a variety of display patterns. However, while the preferred embodiment of the present invention has been described in detail herein, it will be understood by those skilled in the art that various changes in form and detail may be made therein without departing from the spirit and scope of the invention.

I claim:

1. A process for filling, with a liquid crystal material, a cavity between substrates employed to form a liquid crystal display, including
   de-gassing the liquid crystal by placing it in a partial vacuum;
   de-gassing the surfaces on the inside walls of the substrates which from the cavity to be filled by placing it in a partial vacuum along with the liquid crystal;
   placing the display unit into the liquid crystal in the partial vacuum to prepare for filling;
   back filling the partial vacuum with nitrogen or a non-reacting gas to accomplish filling.

2. A process for filling and sealing a liquid crystal display device containing a liquid crystal material and a pair of substrates, the steps comprising:
   forming a cavity between said substrates said cavity suitable for containing said liquid crystal material;
   degassing said liquid crystal material and the surfaces of said substrates by placing said liquid crystal display device in a partial vacuum with said liquid crystal material;
   placing said liquid crystal display device into said liquid crystal material while in a partial vacuum;
   filling said cavity of said liquid crystal display device by replacing the partial vacuum with a non-reacting gas whereby said liquid crystal material is forced into said cavity between said substrates; and
   sealing said cavity of said liquid crystal display device.

3. The process defined in claim 5 wherein said cavity is formed between a pair of substrates by the steps comprising:
   placing a tape spacing member between said substrates;
   placing epoxy about a substantial portion of the perimeter of at least one of said substrates;
   curing said epoxy;
   removing said liquid crystal display device from said liquid crystal material after filling; and
   sealing said liquid crystal display device by adding additional final epoxy to the portion of the perimeter wherein said epoxy has been omitted and curing said final epoxy material whereby a substantially non-contaminated sealed and filled liquid crystal display device is formed.

4. A process in accordance with claim 3 wherein said additional final epoxy is applied in steps comprising:
   sealing said cavity of said liquid crystal device by applying a first epoxy whereby curing time of the sealing epoxy is minimized and resultant contamination of said liquid crystal material is reduced;
   adding a second epoxy whereby the seal made by said first epoxy is mechanically reinforced and secured without introduction of contaminates into said liquid crystal material from said second epoxy.

* * * * *